(12) United States Patent
Kolouri et al.

(10) Patent No.: US 11,210,559 B1
(45) Date of Patent: Dec. 28, 2021

(54) ARTIFICIAL NEURAL NETWORKS HAVING ATTENTION-BASED SELECTIVE PLASTICITY AND METHODS OF TRAINING THE SAME

(71) Applicant: HRL LABORATORIES, LLC, Malibu, CA (US)

(72) Inventors: Soheil Kolouri, Agoura Hills, CA (US); Nicholas A. Ketz, Madison, WI (US); Praveen K. Pilly, Tarzana, CA (US); Charles E. Martin, Thousand Oaks, CA (US); Michael D. Howard, Westlake Village, CA (US)

(73) Assignee: HRL Laboratories, LLC, Malibu, CA (US)

( * ) Notice: Subject to any disclaimer, the term of this patent is extended or adjusted under 35 U.S.C. 154(b) by 115 days.

(21) Appl. No.: 16/549,784

(22) Filed: Aug. 23, 2019

Related U.S. Application Data

(60) Provisional application No. 62/749,821, filed on Oct. 24, 2018, provisional application No. 62/749,540, filed on Oct. 23, 2018.

(51) Int. Cl.
*G06K 9/62* (2006.01)
*G06N 3/08* (2006.01)
(Continued)

(52) U.S. Cl.
CPC ....... *G06K 9/6256* (2013.01); *G06K 9/00805* (2013.01); *G06K 9/6262* (2013.01);
(Continued)

(58) Field of Classification Search
CPC ............... G06K 9/6256; G06K 9/6262; G06K 9/00805; G06K 9/6267; G06K 9/726;
(Continued)

(56) References Cited

U.S. PATENT DOCUMENTS 8,108,328 B2 * 1/2012 Hench ................. G03F 7/70625
706/16
9,846,840 B1 * 12/2017 Lin ..................... G06F 16/5854
(Continued)

OTHER PUBLICATIONS

Aljundi et al., "Memory Aware Synapses: Learning what (not) to forget," arXiv: 1711.09601v4, 24 pages, Oct. 2018.
(Continued)

*Primary Examiner* — Michael S Osinski
(74) *Attorney, Agent, or Firm* — Lewis Roca Rothgerber Christie, LLP

(57) ABSTRACT

An autonomous navigation system for a vehicle includes a controller configured to control the vehicle, sensors configured to detect objects in a path of the vehicle, nonvolatile memory including an artificial neural network configured to classify the objects detected by the sensors, and a processor. The artificial neural network includes a series of neurons in each of an input layer, at least one hidden layer, and an output layer. The memory includes instructions which, when executed by the processor, cause the processor to train the artificial neural network on a first task, identify, utilizing a contrastive excitation backpropagation algorithm, important neurons for the first task, identify, utilizing a learning algorithm, important synapses between the neurons for the first task based on the important neurons identified, and rigidify the important synapses to achieve selective plasticity of the series of neurons in the artificial neural network.

20 Claims, 8 Drawing Sheets

(51) Int. Cl.
*G06N 3/04* (2006.01)
*G06K 9/00* (2006.01)
*G06K 9/72* (2006.01)

(52) U.S. Cl.
CPC ............ *G06K 9/6267* (2013.01); *G06N 3/04* (2013.01); *G06N 3/084* (2013.01); *G06K 9/726* (2013.01)

(58) Field of Classification Search
CPC ............ G06K 9/00791; G06K 9/4628; G06K 9/4676; G06K 9/6215; G06K 9/627; G06N 3/084; G06N 3/04; G06N 3/0454; G06N 3/08; G06N 3/0481; G06N 3/0445; G06N 3/02; G06N 3/063; G06N 3/082; G06N 3/086; G06N 3/088; G06T 2207/20021; G06T 2207/20081; G06T 2207/20084; G06T 2207/10024; G06T 2207/20016; G06T 2207/20076
See application file for complete search history.

(56) References Cited

U.S. PATENT DOCUMENTS

| 2010/0040285 A1* | 2/2010 | Csurka | G06K 9/342 |
| | | | 382/170 |
| 2016/0140408 A1* | 5/2016 | Shen | G06K 9/4628 |
| | | | 382/157 |
| 2017/0200274 A1* | 7/2017 | Tan | G06K 9/6277 |
| 2017/0344884 A1* | 11/2017 | Lin | G06N 3/084 |
| 2018/0247160 A1* | 8/2018 | Rohani | G05D 1/0088 |
| 2019/0108436 A1* | 4/2019 | David | G06N 3/082 |
| 2019/0392268 A1* | 12/2019 | Tariq | G06K 9/00791 |
| 2020/0026997 A1* | 1/2020 | Yang | G06N 3/063 |
| 2020/0125930 A1* | 4/2020 | Martin | G06K 9/6215 |
| 2020/0133273 A1* | 4/2020 | Skorheim | G06N 3/08 |
| 2020/0265307 A1* | 8/2020 | Suh | G06N 3/04 |
| 2020/0320400 A1* | 10/2020 | David | G06N 3/0454 |
| 2020/0410365 A1* | 12/2020 | Cheung | G06N 3/0481 |
| 2021/0027098 A1* | 1/2021 | Ge | G06T 11/20 |
| 2021/0034840 A1* | 2/2021 | Fan | G06K 9/6223 |

OTHER PUBLICATIONS

Kirkpatrick et al., "Overcoming catastrophic forgetting in neural networks," PNAS, 114(13): 3521-3526, Mar. 2017.

Zenke et al., "Continual Learning Through Synaptic Intelligence," Proceedings of the 34th International Conference on Machine Learning, 9 pages, 2017.

Razavian et al., "CNN Features off-the-shelf: an Astounding Baseline for Recognition," Proceedings in the IEEE conference on computer vision and pattern recognition workshops, pp. 806-813, 2014.

Zhang et al., "Top-Down Neural Attention by Excitation Backprop," International Journal of Computer Vision, 126:1084-1102. 2018.

* cited by examiner

FIG. 2
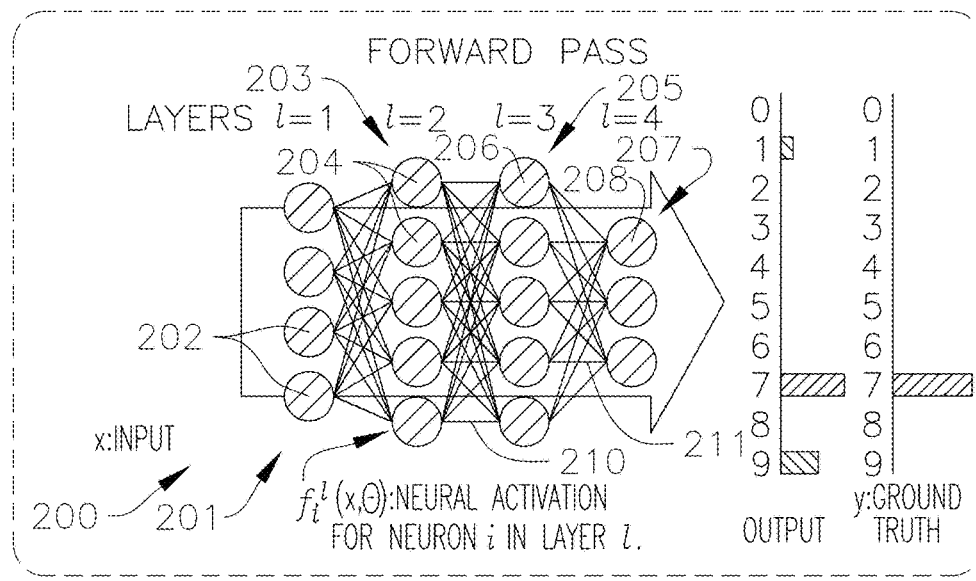
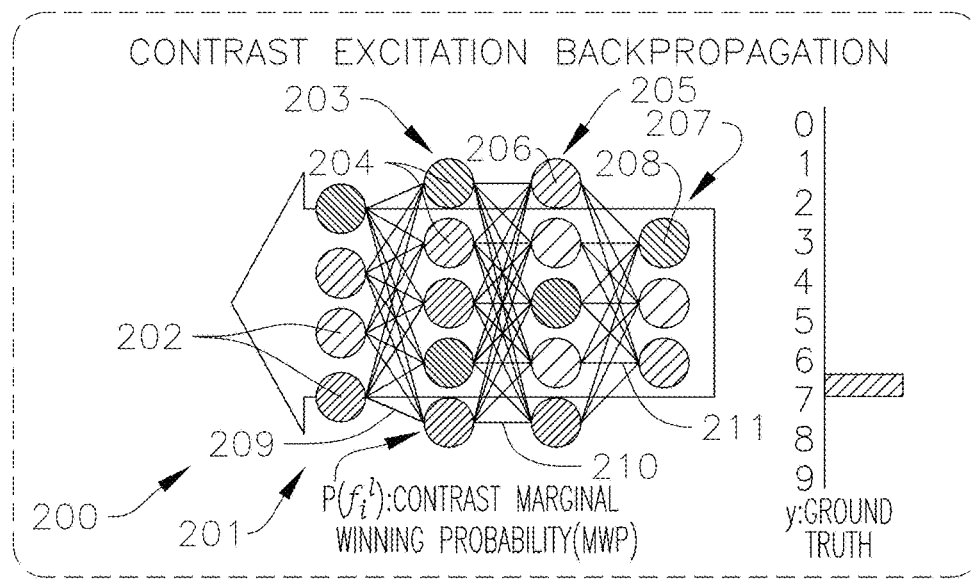
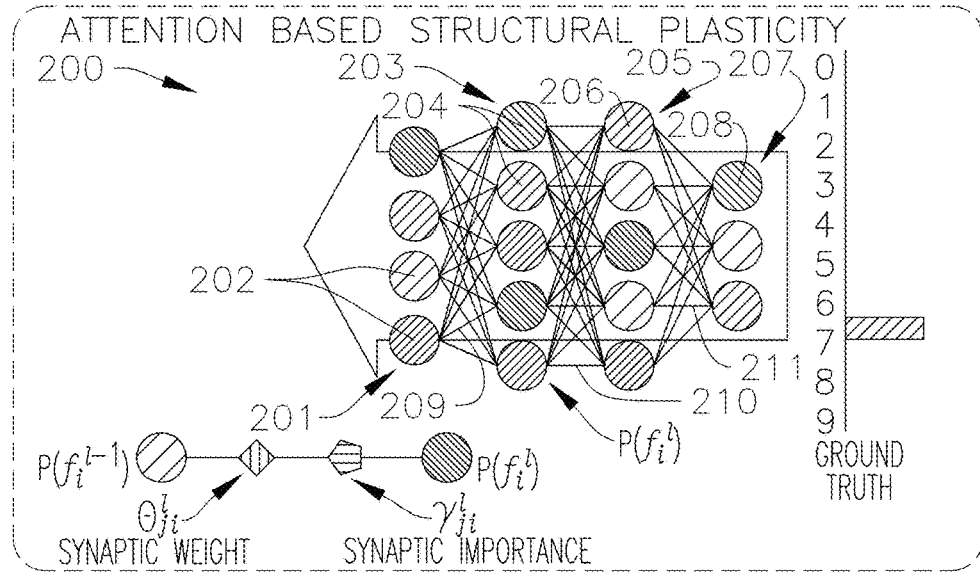

FIG. 4
PERMUTED MNIST
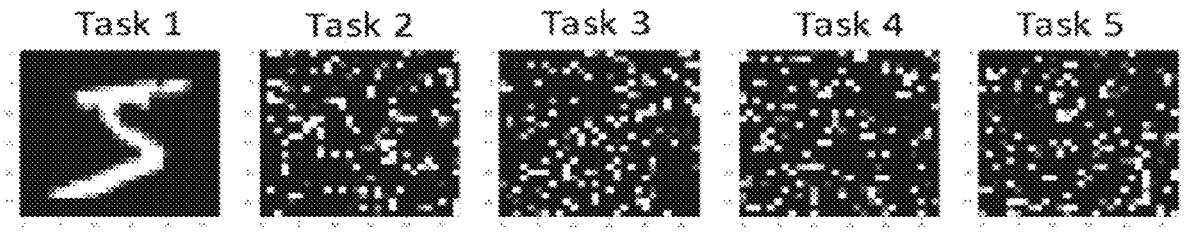
Task 1     Task 2     Task 3     Task 4     Task 5
CATASTROPHIC FORGETTING (WITHOUT c-EB)
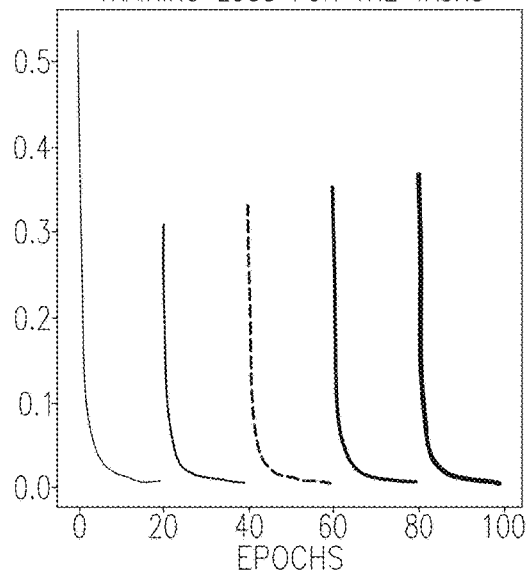
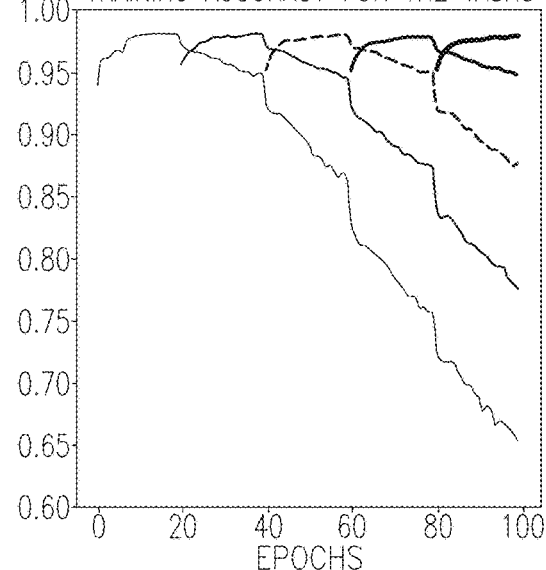
LEARNING WITH c-EB
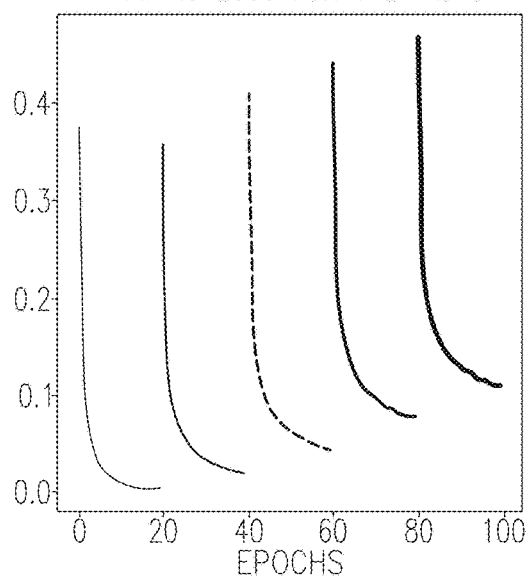
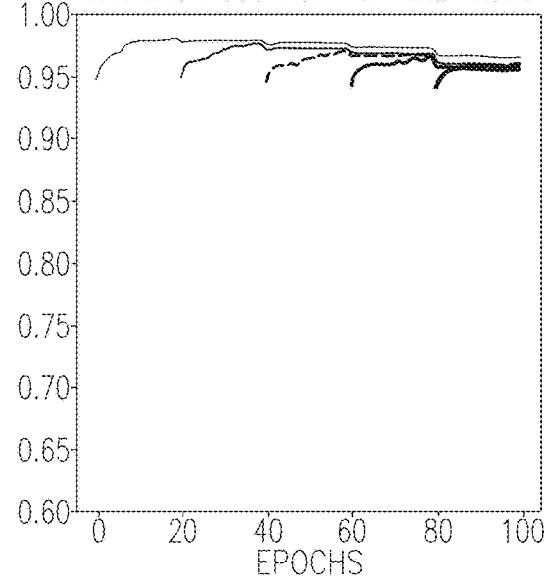

ARTIFICIAL NEURAL NETWORKS HAVING ATTENTION-BASED SELECTIVE PLASTICITY AND METHODS OF TRAINING THE SAME

CROSS-REFERENCE TO RELATED APPLICATION(S)

The present application claims priority to and the benefit of U.S. Provisional Application No. 62/749,821, filed Oct. 24, 2018, and U.S. Provisional Application No. 62/749,540, filed Oct. 23, 2018, the entire contents of both of which are incorporated herein by reference.

BACKGROUND

1. Field

The present disclosure relates generally to artificial neural networks and methods of training artificial neural networks.

2. Description of Related Art

Artificial neural networks are increasingly utilized to perform complex tasks, such as image recognition, computer vision, speech recognition, and medical diagnoses. Artificial neural networks are commonly trained by being presented with a set of examples that have been manually identified as either a positive training example (e.g., an example of the type of image or sound the artificial neural network is intended to recognize or identify) or a negative training example (e.g., an example of the type of image or sound the artificial neural network is intended not to recognize or identify).

Artificial neural networks include a collection of nodes, referred to as artificial neurons, connected to each other via synapses. The connections between the neurons have weights that are adjusted as the artificial neural network learns, which increase or decrease the strength of the signal at the connection depending on whether the connection between those neurons produced a desired behavior of the network (e.g., the correct classification of an image or a sound). Additionally, the artificial neurons are typically aggregated into layers, such as an input layer, an output layer, and one or more hidden layers between the input and output layers, that may perform different kinds of transformations on their inputs.

However, related art artificial neural networks, including deep learning architectures, are uniformly plastic. For instance, the weights of all of the synapses connecting the artificial neurons may be adjusted when the artificial neural network is presented with training data from a new task. This uniform plasticity of the artificial neural network may lead to a phenomenon known as catastrophic forgetting in which the artificial neural network rapidly forgets previously learned tasks when presented with new training data.

SUMMARY

The present disclosure is directed to various embodiments of an autonomous system for a vehicle. In one embodiment, the autonomous system includes a controller configured to control the vehicle, sensors configured to detect objects in a path of the vehicle, nonvolatile memory including an artificial neural network configured to classify the objects detected by the sensors, and a processor. The artificial neural network includes a series of neurons in each of an input layer, at least one hidden layer, and an output layer. The memory includes instructions which, when executed by the processor, cause the processor to train the artificial neural network on a first task, identify, utilizing a contrastive excitation backpropagation algorithm, important neurons for the first task, identify, utilizing a learning algorithm, important synapses between the neurons for the first task based on the important neurons identified, and rigidify the important synapses to achieve selective plasticity of the series of neurons in the artificial neural network.

The instructions, when executed by the processor, may further cause the processor to train the artificial neural network on a second task different than the first task.

The instructions, when executed by the processor, may further cause the processor to send at least one input of the second task to the input layer of the series of layers, generate, at the output layer of the series of layers, at least one output based on the at least one input, generate a reward based on a comparison between the at least one output and a desired output, and modify weights of the synapses based on the reward.

Wherein, during training of the artificial neural network on the second task, the weights of the important synapses may remain constant.

Wherein the learning algorithm to identify important synapses may be a Hebbian learning algorithm as follows: $\beta_{ji}^{l}=\beta_{ji}^{l}+P(a_j^l(x_n))P(a_i^{l+1}(x_n))$, where $\beta_{ji}^{l}$ is a synaptic importance parameter, $x_n$ is an input image, $a_j^l$ is a j'th neuron in an l'th layer of the artificial neural network, $a_i^{l+1}$ is an i'th neuron in layer l+1 of the artificial neural network, and P is a probability.

The learning algorithm to identify important synapses may be Oja's learning rule as follows: $\gamma_{ji}^{l}=\gamma_{ji}^{l}+\in(P_c(f_j^{(l-1)})P_c(f_i^l)-P_c(f_i^l)^2\gamma_{ji}^l)$, where i and j are neurons, l is a layer of the artificial neural network, $P_c$ is a probability, $\gamma_{ji}^l$ is the importance of the synapse between the neurons $f_j^{(l-1)}$ and $f_i^l$ for the first task, $\in$ is the rate of Oja's learning rule, and $P_c$ is a probability.

The instructions, when executed by the processor, may further cause the processor to update a loss function of the artificial neural network as follows: $\mathcal{L}(\theta)=\mathcal{L}_B(\theta)+\lambda\Sigma_k\gamma_k(\theta_k-\theta^*_{A,k})^2$, where $\mathcal{L}(\theta)$ is the loss function, $\mathcal{L}(\theta)$ is an original loss function for learning a second task different than the first task, $\lambda$ is the regularization coefficient, $\gamma_k$ is the synaptic importance parameter of Oja's learning rule, $\theta_k$ is the synaptic weights, and $\theta^*_{A,k}$ are the optimized synaptic weights for performing the first task.

The present disclosure is also directed to various embodiments of a non-transitory computer-readable storage medium having software instructions stored therein. In one embodiment, the software instructions, when executed by a processor, cause the processor to train an artificial neural network on a first task, identify, utilizing a contrastive excitation backpropagation algorithm, important neurons of the artificial neural network for the first task, identify, utilizing a learning algorithm, important synapses between the important neurons, and rigidify the important synapses to achieve selective plasticity of the artificial neural network.

The instructions, when executed by the processor, may further cause the processor to train the artificial neural network on a second task different than the first task.

The instructions, when executed by the processor, may further cause the processor to send at least one input of the second task to an input layer of the artificial neural network, receive at least one output from an output layer of the artificial neural network based on the at least one input, generate a reward based on a comparison between at least one output and a desired output, and modify weights of the synapses based on the reward.

During training of the artificial neural network on the second task, the weights of the important synapses may remain constant.

The learning algorithm may be a Hebbian learning algorithm as follows: $\beta_{ji}^l = \beta_{ji}^l + P(a_j^l(x_n))P(a_i^{l+1}(x_n))$, where $\beta_{ji}^l$ is a synaptic importance parameter, $x_n$ is an input image, $a_j^l$ is a j'th neuron in an l'th layer of the artificial neural network, $a_i^{l+1}$ is an i'th neuron in layer l+1 of the artificial neural network, and P is a probability.

The learning algorithm may be Oja's learning rule as follows: $\gamma_{ji}^l = \gamma_{ji}^l + \in (P_c(f_j^{l-1}))P_c(f_j^l) - P_c(f_i^l)^2 \gamma_{ji}^l)$, where i and j are neurons, l is a layer of the artificial neural network, $P_c$ is a probability, $\gamma_{ji}^l$, is the importance of the synapse between the neurons $f_j^{(l-1)}$ and $f_i^l$ for the first task, $\in$ is the rate of Oja's learning rule, and $P_c$ is a probability.

The instructions, when executed by the processor, may further cause the processor to update a loss function the artificial neural network as follows: $\mathcal{L}(\theta) = \mathcal{L}_B(\theta) + \lambda \Sigma_k \gamma_k (\theta_k - \theta^*_{A,k})^2$, where $\mathcal{L}(\theta)$ is the loss function, $\mathcal{L}_B(\theta)$ is an original loss function for learning a second task different than the first task, $\lambda$ is the regularization coefficient, $\gamma_k$ is the synaptic importance parameter of Oja's learning rule, $\theta_k$ is the synaptic weights, and $\theta^*_{A,k}$ are the optimized synaptic weights for performing the first task.

The present disclosure is also directed to various embodiments of a method of training an artificial neural network having a series of layers, each layer of the plurality of layers comprising a plurality of neurons, and at least one weight matrix encoding connection weights between neurons in successive layers of the plurality of layers. In one embodiment, the method includes training the artificial neural network on a first task, identifying, utilizing contrastive excitation backpropagation, important neurons for the first task, identifying, utilizing a learning algorithm, important synapses for the first task based on the important neurons identified, and rigidifying the important synapses to achieve selective plasticity of the plurality of neurons in the artificial neural network.

The method may also include training the artificial neural network on a second task different than the first task. The training of the artificial neural network on the second task includes sending at least one input of the second task to an input layer of the plurality of layers, generating, at an output layer of the plurality of layers, at least one output based on the at least one input, generating a reward based on a comparison between the at least one output and a desired output, and modifying the connection weights based on the reward.

During the training of the artificial neural network on the second task, the weights of the important synapses remain constant.

The learning algorithm may be a Hebbian learning algorithm as follows: $\beta_{ji}^l = \beta_{ji}^l + P(a_j^l(x_n))P(a_i^{l+1}(x_n))$, where $\beta_{ji}^l$ is a synaptic importance parameter, $x_n$ is an input image, $a_j^l$ is a j'th neuron in an l'th layer of the artificial neural network, $a_i^{l+1}$ is an i'th neuron in layer l+1 of the artificial neural network, and P is a probability.

The learning algorithm may be Oja's learning rule as follows: $\gamma_{ji}^l = \gamma_{ji}^l + \in (P_c(f_j^{(l-1)}))P_c(f_j^l) - P_c(f_i^l)^2 \gamma_{ji}^l)$, where i and j are neurons, l is a layer of the artificial neural network, $P_c$ is a probability, $\gamma_{ji}^l$ is the importance of the synapse between the neurons $f_j^{(l-1)}$ and $f_i^l$ for the first task, $\in$ is the rate of Oja's learning rule, and $P_c$ is a probability.

The method may also include updating a loss function of the artificial neural network as follows: $\mathcal{L}(\theta) = \mathcal{L}_B(\theta) + \lambda \Sigma_k \gamma_k (\theta_k - \theta^*_{A,k})^2$, where $\mathcal{L}(\theta)$ is the loss function, $\mathcal{L}_B(\theta)$ is an original loss function for learning a second task different than the first task, $\lambda$ is the regularization coefficient, $\gamma_k$ is the synaptic importance parameter of Oja's learning rule, $\theta_k$ is the synaptic weights, and $\theta^*_{A,k}$ are the optimized synaptic weights for performing the first task.

This summary is provided to introduce a selection of concepts that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIG. 2 is schematic view of an artificial neural network being trained according to the method of FIG. 1;

FIG. 4 depicts graphs comparing the performance of the systems and methods of the present disclosure utilizing c-EBP to related art systems and methods not utilizing c-EBP at performing five different permuted MNIST tasks;

DETAILED DESCRIPTION

The present disclosure is directed to various embodiments of artificial neural networks and methods of training artificial neural networks utilizing selective plasticity such that the artificial neural network can learn new tasks (e.g., road detection during nighttime) without forgetting old tasks (e.g., road detection during daytime). The selective plasticity of the present disclosure is achieved by utilizing a contrastive excitation backpropagation (c-EBP) framework, which is an attentional mechanism, that identifies neurons that are significant for solving a particular task, and by utilizing Oja's learning rule to rigidify the synaptic connections between these significant neurons such that the rigidified synaptic connections do not change during learning of a new task. In this manner, the artificial neural networks of the present disclosure utilize selective plasticity of the synapses to maintain previously learned tasks while learning new tasks and thereby effectively accumulate new knowledge. That is, the artificial neural networks of the present disclosure utilize selective plasticity to learn new tasks without suffering from catastrophic forgetting, which occurs with related art artificial neural networks that employ uniform plasticity of the synapses.

Figure 1:
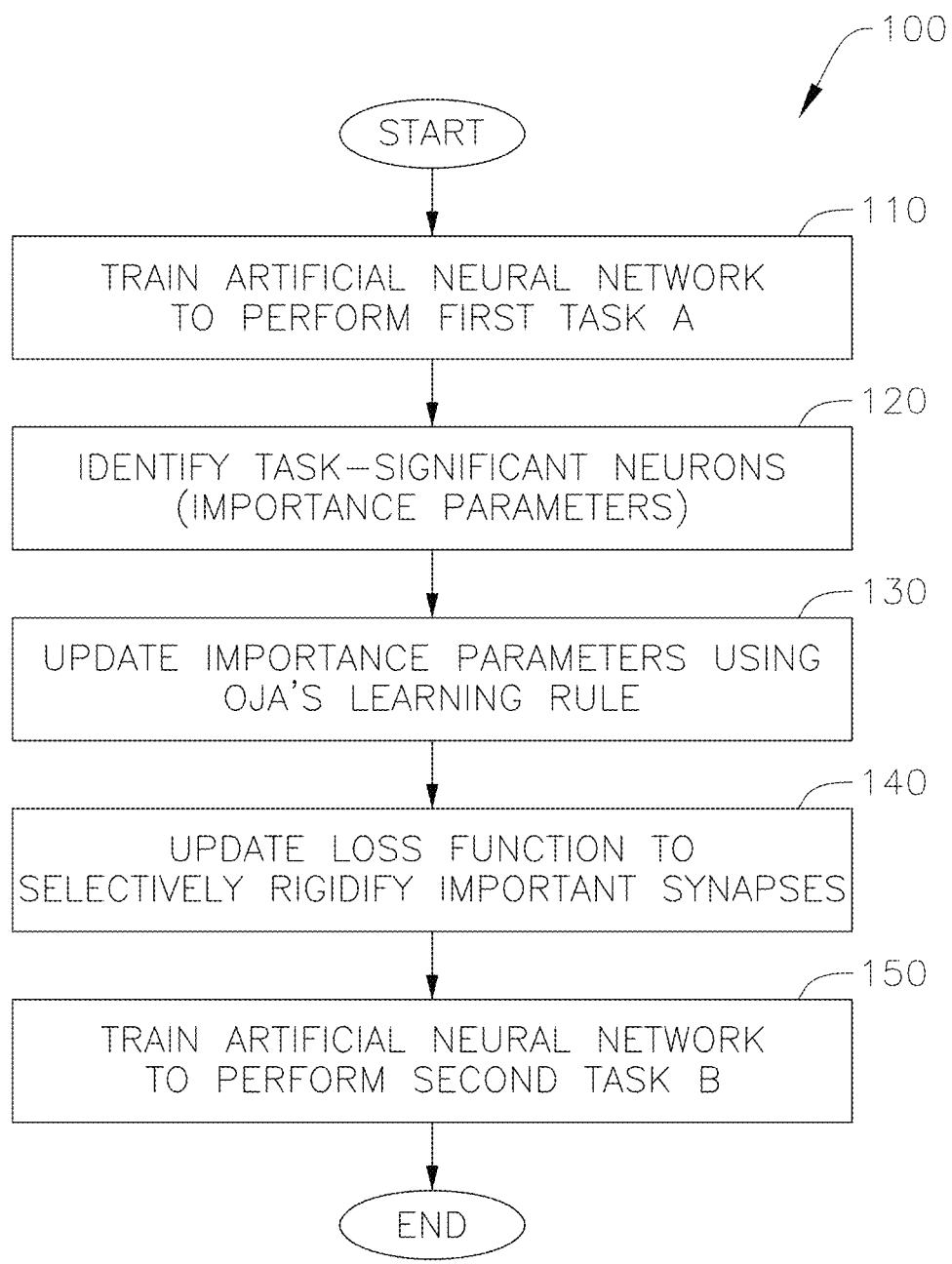
FIG. 1 is a flowchart illustrating tasks of a method of training an artificial neural network according to one embodiment of the present disclosure.

FIG. 1 is a flowchart illustrating tasks of a method 100 of training an artificial neural network utilizing selective synaptic plasticity according to one embodiment of the present disclosure. FIG. 2 depicts an example of an artificial neural network 200 undergoing training according to the method 100 illustrated in FIG. 1. In the embodiment illustrated in FIG. 2, the artificial neural network 200 includes an input layer 201 having a series of input layer neurons 202, a first hidden layer 203 having a series of first hidden layer neurons 204, a second hidden layer 205 having a series of second hidden layer neurons 206, and an output layer 207 having a series of output layer neurons 208. In the illustrated embodiment, a series of synapses 209 connect each of the input layer neurons 202 in the input layer 201 to each of the first hidden layer neurons 204 in the first hidden layer 203, a series of synapses 210 connect each of the first hidden layer neurons 204 in the first hidden layer 203 to each of the second hidden layer neurons 206 in the second hidden layer 205, and a series of synapses 211 connect each of the second hidden layer neurons 206 in the second hidden layer 205 to each of the output layer neurons 208 in the output layer 207. Moreover, each of the synapses 209, 210, 211 between the neurons in adjacent layers have an associated connection weight. Additionally, each of the neurons 202, 204, 206, 208 in the artificial neural network 200 is associated with an activation function configured to receive the inputs to the neurons 202, 204, 206, 208 as arguments to the activation function and compute an output value for the neurons 202, 204, 206, 208 based on the inputs to determine the activation states of the neurons 202, 204, 206, 208. Although in the illustrated embodiment the artificial neural network 200 includes two hidden layers 203, 205, in one or more embodiments, the artificial neural network 200 may include any other suitable number of hidden layers and each layer may have any suitable number of neurons depending, for instance, on the desired complexity of the task that the artificial neural network is capable of learning and performing during artificial neural network inference. Furthermore, although in the illustrated embodiment the artificial neural network 200 is a fully-connected artificial neural network (i.e., each neuron is connected to each neuron in the adjacent layer), in one or more embodiments, the artificial neural network 200 may not be fully connected.

In the embodiment illustrated in FIG. 1, the method 100 includes a task 110 of training the artificial neural network 200 to perform a first task A (e.g., semantic segmentation of an image of a driving scene, such as nighttime image, a daytime image, or a rainy image). The task 110 of training the artificial neural network 200 includes updating the artificial neural network 200 via backpropagation to update the synaptic weights to minimize the loss according to a suitable loss function.

In the illustrated embodiment, the method 100 also includes a task 120 of calculating or determining the neurons 202, 204, 206, 208 of the artificial neural network 200 that are significant for the performance of the first task A (i.e., the task 120 includes identifying task-significant neurons 202, 204, 206, 208 in the artificial neural network 200). In one or more embodiments, the task 120 of identifying the task-significant neurons 202, 204, 206, 208 includes performing excitation backpropagation (EBP) to obtain top-down signals that identify the task-significant neurons 202, 204, 206, 208 of the artificial neural network 200. EBP provides a top-down attention model for neural networks that enables generation of task/class-specific attention maps. EBP introduces a back-propagation scheme by extending the idea of winner-take-it-all into a probabilistic setting. In one or more embodiments, the task 120 of calculating the neurons 202, 204, 206, 208 of the artificial neural network 200 that are significant for the performance of the first task may utilize the contrastive version of the EBP algorithm (c-EBP) to make the top-down signal more task-specific. In the EBP formulation, the top-down signal is defined as a function of the probability output.

In one or more embodiments, the task 120 of identifying the task-significant neurons 202, 204, 206, 208 for the performance of the first task A may be performed by defining the relative importance of neuron $f_i^{(l-1)}$ on the activation of neuron $f_i^l$ as a probability distribution $P(f_j^{(l-1)})$, over neurons in layer (l-1), where $f_i^l$ is the i'th neuron in layer l of the artificial neural network 200, where $f_i^l = \sigma(\Sigma_{ji} \theta_{ji}^l f_j^{(l-1)})$, and where $\theta^l$ is the synaptic weights between layers (l-1) and l. The probability distribution $P(f_j^{(l-1)})$ can be factored as follows:

$$P(f_j^{l-1}) = \Sigma_i P(f_j^{(l-1)} | f_i^l) P(f_i^l) \qquad \text{(Equation 1)}$$

$P(f_i^l)$ is the Marginal Winning Probability (MWP) for neuron $f_i^l$. Additionally, in one or more embodiments, the task 120 includes defining the conditional probability $P(f_j^{(l-1)} | f_i^l)$, as follows:

$$P(f_j^{(l-1)} | f_i^l) = \begin{cases} Z_i^{(l-1)} f_j^{(l-1)} \theta_{ji}^l & \text{if } \theta_{ji}^{(l-1)} \geq 0 \\ 0 & \text{otherwise} \end{cases} \qquad \text{(Equation 2)}$$

where $Z_i^{(l-1)} = (\Sigma_j f_j^{(l-1)} \theta_{ji}^l)^{-1}$ is a normalization factor such that $\Sigma_j P(f_j^{(l-1)} | f_i^l) = 1$. For a given input, x (e.g., an input image), EBP generates a heat-map in the pixel-space with respect to class y by starting with $P(f_i^L = y) = 1$ at the output layer 207 and applying Equation 2 above recursively. The contrastive excitation backpropagation (c-EBP) assigns a hypothetical negative neuron $\bar{f}_i^L$ with weights $\gamma_{ji}^L = \gamma_{ji}^L$. Additionally, the c-EBP then recursively calculates $\overline{P}(f_j^{(l-1)} | f_i^l)$ for this negative neuron $\bar{f}_i^L$. The final relative importance of the neurons is then calculated as a normalized difference of $P(f_j^{(l-1)} | f_i^l)$ and $\overline{P}(f_j^{(l-1)} | f_i^l)$ as follows:

$$P_c(f_j^{(l-1)} | f_i^l) = \frac{ReLU(P(f_j^{(l-1)} | f_i^l) - \overline{P}(f_j^{(l-1)} | f_i^l))}{\sum_j ReLU(P(f_j^{(l-1)} | f_i^l) - \overline{P}(f_j^{(l-1)} | f_i^l))}$$

where ReLU is the rectified linear function. Additionally, the contrastive-MWP, $P_c(f_i^l)$, indicates the relative importance of neuron $f_i^l$ for specific prediction y. Additionally, the contrastive-MWP, $P_c(f_i^l)$, can be understood as the implicit amount of attention that the artificial neural network 200 pays to neuron $f_i^l$ to predict y.

Figure 3:
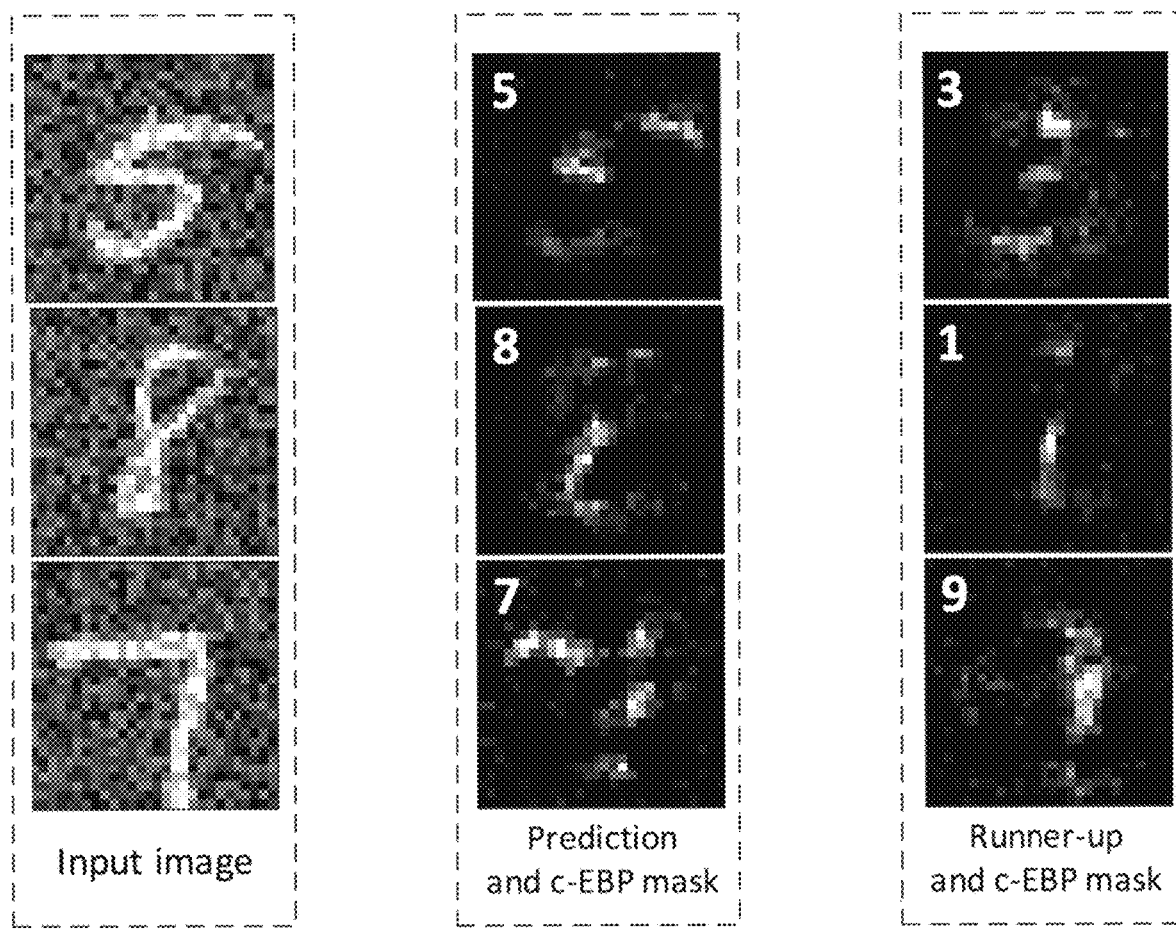
FIG. 3 is a depiction of contrastive excitation backpropagation (c-EBP) top-down attention maps of the artificial neural network of the present disclosure when trained on a Modified National Institute of Standards and Technology (MNIST) dataset.

FIG. 3 is a depiction of c-EBP top-down attention maps at the input layer 201 of the artificial neural network 200 of the present disclosure when trained on a Modified National Institute of Standards and Technology (MNIST) handwritten digit dataset, which is a benchmark problem for optical character classification. The left column of images in FIG. 3 are the input images (e.g., images of handwritten numbers "5,", "8, and 7"), the middle column of images in FIG. 3 are the attentional map generated by c-EBP during task 120 for the predicted labels (i.e., the highest activity after the softmax layer), and the right column of images in FIG. 3 are the runner-up predicted labels. As illustrated in FIG. 3, the top-down signals contain the task-relevant portions of the input (i.e., the input neurons 202). Task 120 calculates these top-down importance signals utilizing c-EBP for all neurons 202, 204, 206, 208 in the artificial neural network 200.

With continued reference to FIG. 1, the method 100 also includes a task 130 of determining the importance of the synapses 209, 210, 211 between the neurons 202, 204, 206, 208 for the performance of the first task A for which the artificial neural network 200 is trained in task 110 (i.e., the task 130 includes identifying attention-based synaptic importance for the performance of the first task A). In one or more embodiments, the importance of a synapse 209, 210, 211 is increased if its pre- and post-synaptic neurons 202, 204, 206, 208 are important, as identified according to Equation 1 above in task 120 (i.e., if a synapse 209, 210, 211 is between two task-relevant neurons 202, 204, 206, 208, then its importance is increased). In one or more embodiments, the task 130 of identifying the importance of the synapses 209, 210, 211 is performed utilizing a Hebbian learning algorithm. In one or more embodiments, the task 130 of identifying the importance of the synapses 209, 210, 211 utilizing the Hebbian learning algorithm includes calculating a synaptic importance parameter $\beta_{ji}^{l}$ for each of the synapses 209, 210, 211. According to one or more embodiments of the present disclosure, the synaptic importance parameter $\beta_{ji}^{l}$ for each of the synapses 209, 210, 211 is initialized to zero, and, during the training of the artificial neural network 200 to perform the first task during task 110, for each input image $x_n$, the importance parameters $\beta_{ji}^{l}$ of the artificial neural network 200 are updated according to Equation 3 as follows:

$$\beta_{ji}^{l}=\beta_{ji}^{l}+P(a_j^{l}(x_n))P(a_i^{l+1}(x_n)) \quad \text{(Equation 3)}$$

where $a_j^{l}$ is the j'th neuron in the l'th layer of the artificial neural network, $a_i^{l+1}$ is the i'th neuron in the l+1 layer of the artificial neural network, and P is a probability.

Additionally, in one or more embodiments, the probability distribution for the output layer 207 is set to the one-hot vector of the input label, $P(a_j^{L}(x_n))=y_n$.

However, Hebbian learning of importance parameters may suffer from the problem of unbounded growth of the importance parameters. To avoid the problems of Hebbian learning, in one or more embodiments the task 130 of determining the synaptic importance utilizes Oja's learning rule (i.e., Oja's learning algorithm) to calculate the importance, $\gamma_{ji}^{l}$, of the synapse between the neurons $f_j^{(l-1)}$ and $f_i^{l}$ for the first task A as follows:

$$\gamma_{ji}^{l}=\gamma_{ji}^{l}+\in(P_c(f_j^{(l-1)})(P_c(f_i^{l})-P_c(f_i^{l})^2\gamma_{ji}^{l}) \quad \text{(Equation 4)}$$

where $\in$ is the rate of Oja's learning rule, i and j are neurons, l is a layer of the artificial neural network, and $P_c$ is a probability. The task 130 of updating the importance parameters via Oja's learning rule is performed in an online manner, starting from $\gamma_{ji}^{l}=0$, during or following the task of updating the artificial neural network 200 via back-propagation during the task 110 of training the artificial neural network 200.

With continued reference to the embodiment illustrated in FIG. 1, the method 100 also includes a task 140 of rigidifying the important synapses identified in task 130 such that weights associated with those important synapses are fixed or substantially fixed (i.e., remain constant or substantially constant) when the artificial neural network 200 is trained on one or more new tasks (i.e., when the artificial neural network 200 is trained to perform inference on one or more tasks that are different than the task that the artificial neural network 200 was originally trained to perform). In one or more embodiments, the weights associated with the important synapses may not be fixed, but the important synapses may be allocated relatively less plasticity than the synapses that are not important for the performance of the first task A. In this manner, the artificial neural network 200, following the task 140 of rigidifying the synapses associated with the important neurons, exhibits selective plasticity without catastrophic forgetting. In one or more embodiments, the task 140 of rigidifying the important synapses is performed by regularizing the loss function of the artificial neural network 200 with the computed synaptic importance parameters (calculated according to task 130 described above) as follows:

$$\mathcal{L}(\theta)=\mathcal{L}_B(\theta)+\lambda\Sigma_k\gamma_k(\theta_k-\theta^*_{A,k})^2 \quad \text{(Equation 5)}$$

where $\mathcal{L}(\theta)$ is the loss function, $\mathcal{L}_B(\theta)$ is the original loss function for learning a second task (task B) different than the first task A (i.e., the cross entropy loss), $\lambda$ is the regularization coefficient, $\gamma_k$ is the synaptic importance parameter defined in Equation 4 above, and $\theta_k$ is the synaptic weights, and $\theta^*_{A,k}$ are the optimized synaptic weights for performing task A. In one or more embodiments, the importance parameters may be calculated in an online manner such that there is no need for definition of tasks and the method can adaptively learn the changes in the training data.

In the illustrated embodiment, the method 200 also includes a task 150 of training the artificial neural network 200 on the second task B different than the first task A on which the artificial neural network 200 was trained in task 110. As described above, the artificial neural network 200, following the task 140 of rigidifying the synapses associated with the important neurons, exhibits selective plasticity without catastrophic forgetting when the artificial neural network 200 is trained on the second task B different from the first task A.

FIG. 4 depicts graphs comparing the performance of the systems and methods of the present disclosure utilizing c-EBP to related art systems and methods not utilizing c-EBP at performing five different permuted MNIST tasks, shown at the top row of images in FIG. 4. In the illustrated embodiment, the first task is an original MNIST problem and the second, third, fourth, and fifth tasks are fixed but random permutations of the digit images. In one or more embodiments, the artificial neural network was first trained on the first task (i.e., learning the original MNIST digit image) according to an embodiment of the method 100 disclosed herein (i.e., attention-based selectively plastic perceptron). After training on the original MNIST digit image and achieving saturated accuracy (approximately 98%), attention maps were generated utilizing c-EBP. Gaussian noise was added to the MNIST test images (tasks 2 through 5) and then the attention maps were calculated at the input layer of the artificial neural network setting the top down signal to be (1) the predicted label (i.e., the neuron with the highest activation after softmax layer) and (2) the runner up predicted label (i.e., the neuron with the second highest activation). FIG. 3 depicts the inputs and their corresponding attention maps for three sample digits. FIG. 4 depicts the results of learning the consecutive permuted MNIST problems. In the illustrated embodiment, a Multi-Layer Perceptron (MLP) with two hidden layers, each having four-hundred neurons, was utilized. Additionally, Rectified Linear Units (ReLUs) were utilized as nonlinear activation functions and the ADAM optimizer with learning rate, lr=1e−3, for optimizing the networks. FIG. 4 depicts the average training loss as well as the average testing accuracy over 10 runs for all five tasks for both the related art network (i.e., a related art network trained without selective plasticity) and an artificial neural network trained according to the methods of the present disclosure (i.e., with selective plasticity). As illustrated in FIG. 4, the related art method without selective plasticity suffered from catastrophic forgetting (e.g., the accuracy of performing the first task dropped to approximately 65%, the accuracy of performing the second task dropped to approximately 77%, and the accuracy of performing the third task dropped to approximately 87% when the artificial neural network was trained on the permuted MNIST problems consecutively), whereas the method of the present disclosure utilizing selective plasticity did not suffer from catastrophic forgetting (e.g., the accuracy of performing each of the tasks remained at approximately 95% when the artificial neural network was trained on the permuted MNIST problems consecutively).

Figure 5:
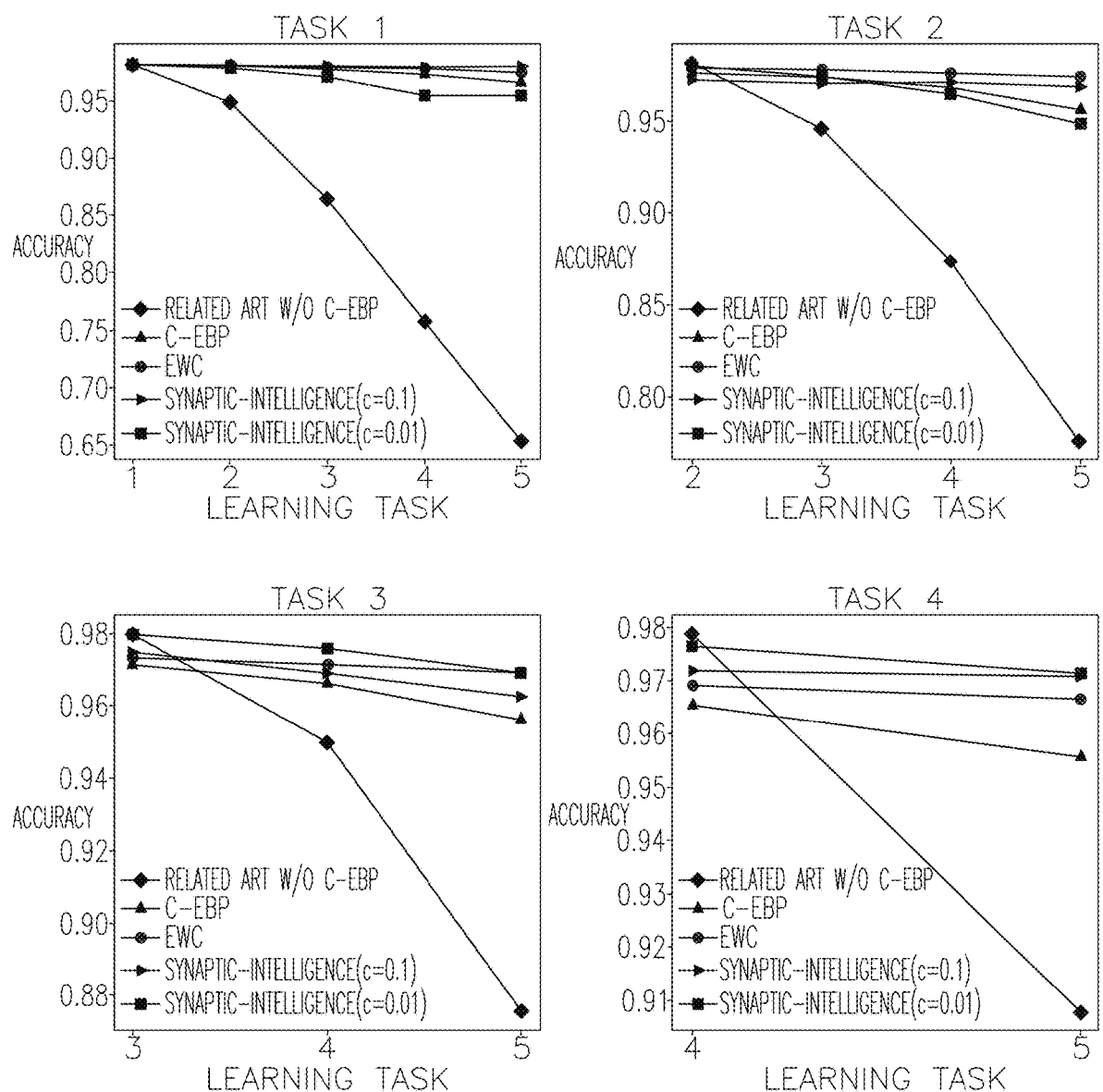
FIG. 5 depicts graphs comparing the performance of the systems and methods of the present disclosure utilizing c-EBP to related art systems and methods, Elastic Weight Consolidation (EWC) and Synaptic Intelligence, at performing the five different permuted MNIST tasks.

FIG. 5 depicts graphs comparing the performance of the systems and methods of the present disclosure utilizing c-EBP to related art systems and methods, Elastic Weight Consolidation (EWC) and Synaptic-Intelligence, at performing the five different permuted MNIST tasks. In FIG. 5, the upper left hand graph depicts the efficiency of the various methods and systems at performing the first task (i.e., recognizing the first handwritten number) while learning each of the subsequent tasks (i.e., recognizing the second, third, fourth, and fifth permuted handwritten numbers). Similarly, the upper right hand graph depicts the efficiency of the various methods and systems at performing the second task while learning each of the subsequent tasks, the lower right hand graph depicts the efficiency of the various methods and systems at performing the third task while learning each of the subsequent tasks, and the lower right hand graph depicts the efficiency of the various methods and systems at performing the fourth task while learning the final task (i.e., Task 5, the last permuted hand written number). The network architecture, optimizer, learning rates, and batch size (batch size=100) were kept the same for all methods and the optimal hyper parameters disclosed in Kirkpatrick, "Overcoming catastrophic forgetting in neural networks," Proceedings of the national academy of sciences, page 201611835, 2017 and Zenke, "Continual learning through synaptic intelligence," International Conference on Machine Learning, pages 3987-3995, 2017, were utilized. The entire contents of Kirkpatrick and Zenke are incorporated herein by reference. Each plot in FIG. 5 shows the classification accuracy for task t after learning tasks t, t+1, ..., t=5. In FIG. 5, c is a hyper-parameter for the Synaptic Intelligence algorithm, and FIG. 5 depicts the performance of the Synaptic Intelligence algorithm utilizing c=0.1 and c=0.01. As shown in FIG. 5, the artificial neural network trained according to the methods disclosed herein (i.e., with selective plasticity) performed comparably to the EWC and Synaptic Intelligence algorithms with no or substantially no hyper-parameter tuning of the network training according to the methods disclosed herein.

Figure 6:
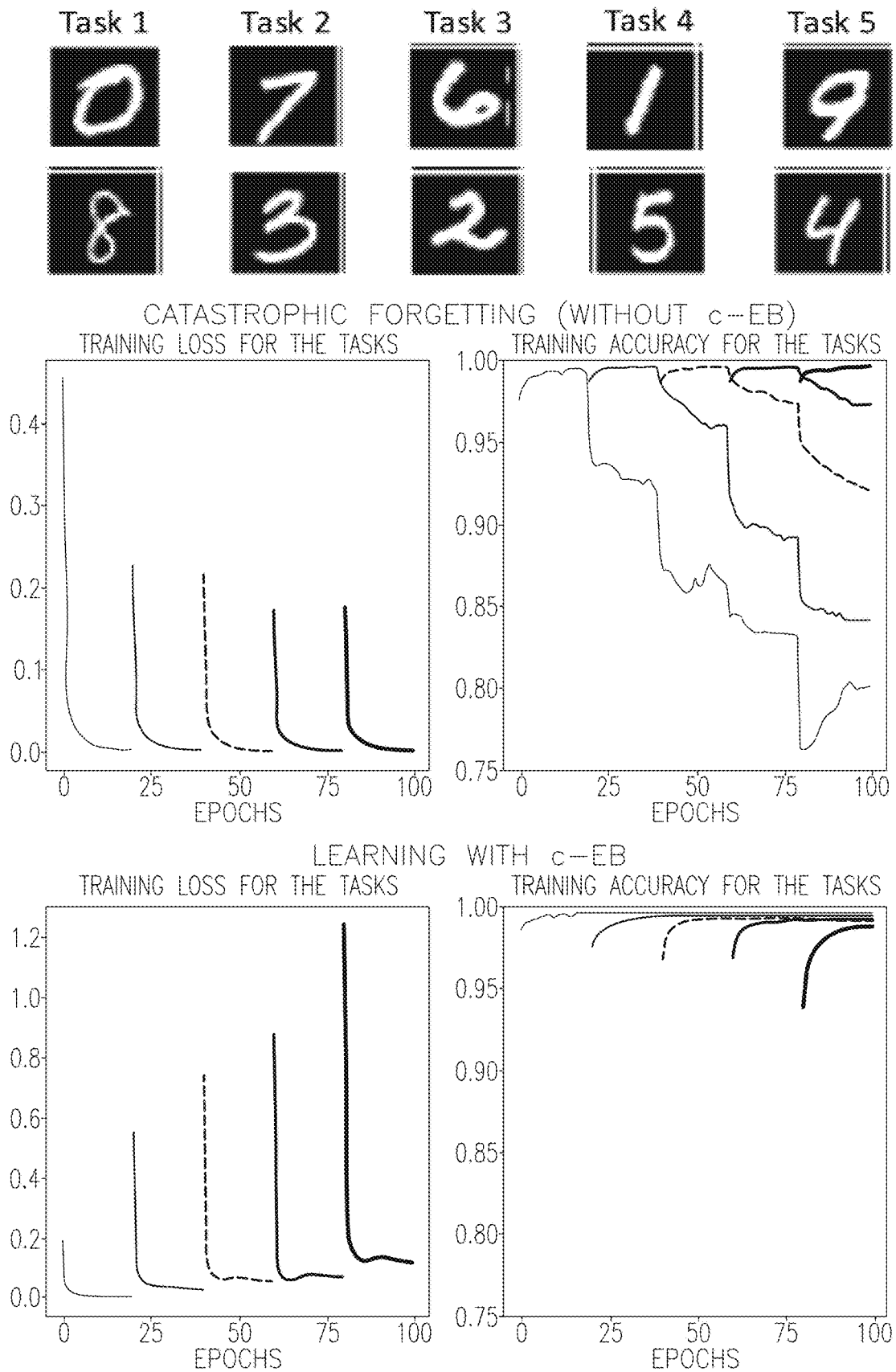
FIG. 6 depicts graphs comparing the performance of the systems and methods of the present disclosure utilizing c-EBP to related art systems and methods not utilizing c-EBP at performing five different split MNIST tasks.

FIG. 6 depicts graphs comparing the performance of the systems and methods of the present disclosure utilizing c-EBP to related art systems and methods not utilizing c-EBP at performing five different split MNIST tasks. In the illustrated embodiment, the split MNIST tasks are randomly chosen pairs of digits (e.g., [0,8], [7,3], [6,2], [1,5], and [9,4]). In general, the split MNIST task is a more realistic lifelong learning scenario compared to the permuted MNIST described above with reference to FIGS. 4-5. In split MNIST, knowledge from the previously learned tasks could be transferred to learning future tasks.

As illustrated in FIG. 6, the related art method without selective plasticity suffered from catastrophic forgetting (e.g., the accuracy of performing the first split MNIST task dropped to approximately 80%, the accuracy of performing the second split MNIST task dropped to approximately 85%, and the accuracy of performing the third split MNIST task dropped to approximately 92% when the artificial neural network was trained on the permuted MNIST problems consecutively), whereas the method of the present disclosure utilizing selective plasticity did not suffer from catastrophic forgetting (e.g., the accuracy of performing each of the split MNIST tasks remained at approximately 100% when the artificial neural network was trained on the permuted split MNIST problems consecutively).

Figure 7:
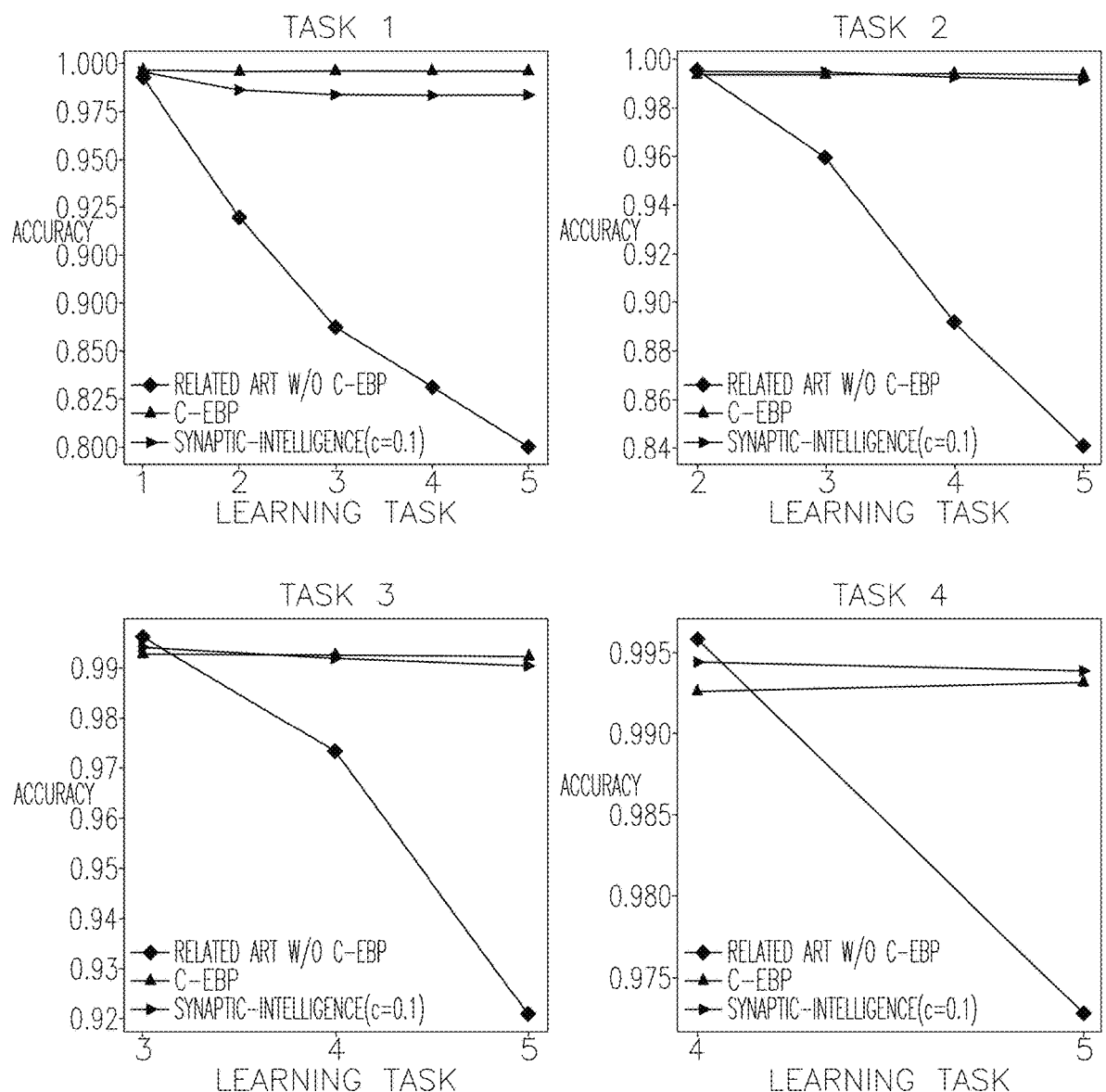
FIG. 7 depicts graphs comparing the performance of the systems and methods of the present disclosure utilizing c-EBP to related art systems and methods, Elastic Weight Consolidation (EWC) and Synaptic Intelligence, at performing the five different split MNIST tasks.

FIG. 7 depicts graphs comparing the performance of the systems and methods of the present disclosure utilizing c-EBP to a related art system and method, Synaptic Intelligence, as well as to a related art neural network with the same architecture as the present disclosure, but without utilizing c-EBP, at performing the five different split MNIST tasks. As illustrated in FIG. 7, the systems and methods of the present disclosure utilizing c-EBP performed comparably to the Synaptic Intelligence method, and both performed substantially better than the related art neural network that did not utilize c-EBP.

The methods of the present disclosure may be performed by a processor and/or a processing circuit executing instructions stored in non-volatile memory (e.g., read-only memory ("ROM"), programmable ROM ("PROM"), erasable programmable ROM ("EPROM"), electrically erasable programmable ROM "EEPROM"), flash memory, etc.). The term "processor" or "processing circuit" is used herein to include any combination of hardware, firmware, and software, employed to process data or digital signals. The hardware of a processor may include, for example, application specific integrated circuits (ASICs), general purpose or special purpose central processors (CPUs), digital signal processors (DSPs), graphics processors (GPUs), and programmable logic devices such as field programmable gate arrays (FPGAs). In a processor, as used herein, each function is performed either by hardware configured (i.e., hardwired) to perform that function, or by more general purpose hardware, such as a CPU, configured to execute instructions stored in a non-transitory storage medium. A processor may be fabricated on a single printed wiring board (PWB) or distributed over several interconnected PWBs. A processor may contain other processors; for example a processor may include two processors, an FPGA and a CPU, interconnected on a PWB.

Figure 8:
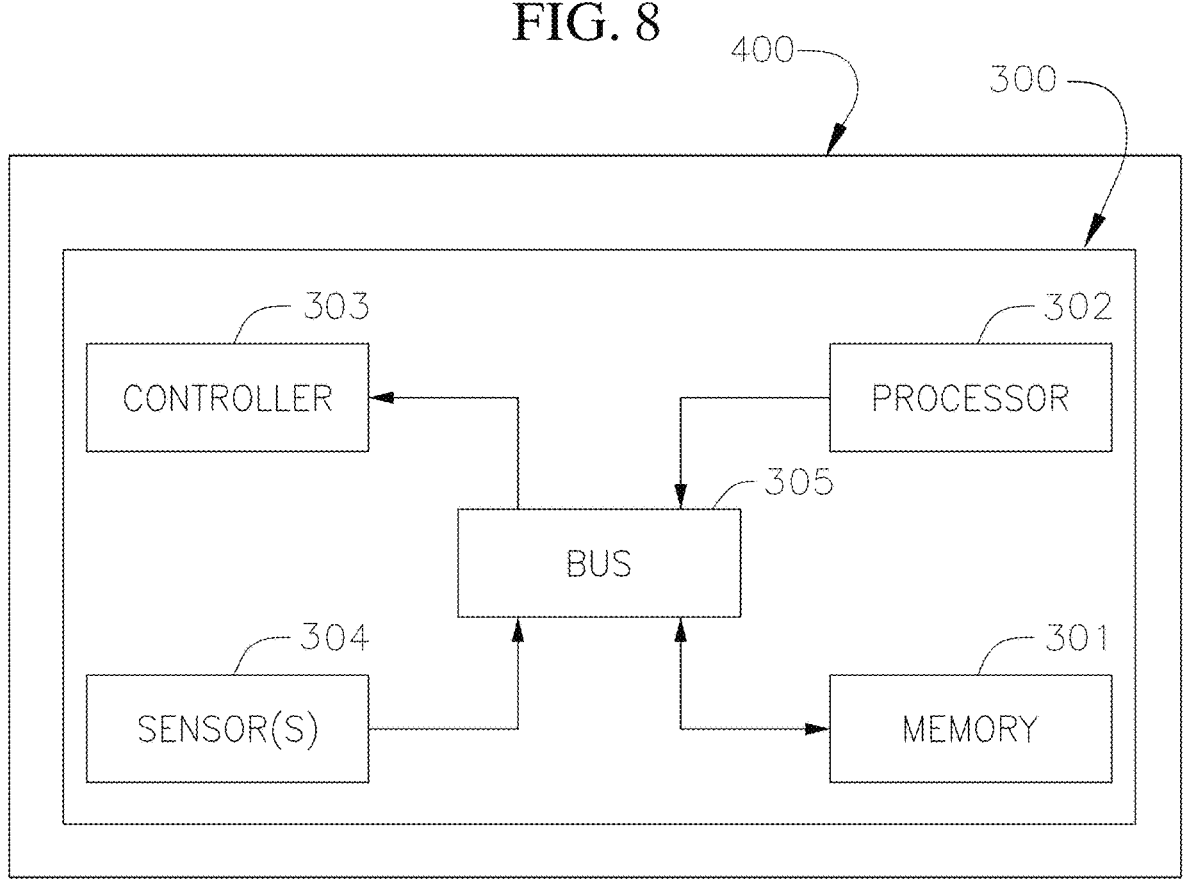
FIG. 8 is a block diagram of an autonomous system according to one embodiment of the present disclosure.

FIG. 8 is a block diagram of an autonomous system 300 incorporated into a device or system 400, such as a vehicle (e.g., an automobile, an aircraft, or a vehicle, intelligence, surveillance and reconnaissance (ISR) device), manufacturing equipment, or industrial equipment (e.g., automated assembly line equipment). The autonomous system 300 may be configured to autonomously control, at least in part, the device or system 400 into which the autonomous system 300 is incorporated. For instance, in one or more embodiments, the autonomous system 300 may be utilized in manufacturing (e.g., to manipulate component parts or recognize defective component parts for a product) or in transportation (e.g., semantic segmentation of driving scenes and automatic operation of a vehicle to reach a waypoint or destination).

In the illustrated embodiment, the autonomous system 300 includes a memory device 301 (e.g., non-volatile memory, such as read-only memory ("ROM"), programmable ROM ("PROM"), erasable programmable ROM ("EPROM"), electrically erasable programmable ROM "EEPROM"), flash memory, etc.), a processor or a processing circuit 302, a controller 303, and at least one sensor 304. The memory device 301, the processor or processing circuit 302, the controller 303, and the at least one sensor 304 may communicate with each other over a system bus 305. In one or more embodiments in which the autonomous system 300 is configured to control an autonomous or semi-autonomous vehicle, the sensors 304 may be any suitable type or kind of sensors configured to detect objects or situations in a path of the autonomous vehicle, such as one or more cameras, lidars, and/or radars, and the controller 303 may be connected to any suitable vehicle components for controlling the vehicle, such as brakes, the steering column, and/or the accelerator, based on the objects or situations detected by the one or more sensors 304.

In one or more embodiments, the memory device 301 is programmed with instructions which, when executed by the processor or processing circuit 302, cause the processor or processing circuit 302 to perform each of the tasks described above with reference to the flowchart depicted in FIG. 1. Alternatively, the processor or processing circuit 302 may be configured to execute instructions retrieved from an online data storage unit such as in "Cloud" computing and the online data storage unit may include the artificial neural network.

Additionally, in one or more embodiments, the memory device 301 is programmed with an artificial neural network configured to perform one or more tasks for operating or controlling the device into which the autonomous system 300 is installed. In one or more embodiments, the artificial neural network may be stored in an online data storage unit (e.g., in the "cloud") and accessible by the processor or processing circuit 302.

In one or more embodiments, the memory device 301 or the online data storage unit is programmed with instructions (i.e., software) which, when executed by the processor or processing circuit 302, cause the processor or processing circuit 302 to train the artificial neural network to perform a first task A (e.g., semantic segmentation of an image captured by one of the sensors 304, such as a daytime image captured by a camera).

Additionally, in one or more embodiments, the memory device 301 or the online data storage unit is programmed with instructions which, when executed by the processor or processing circuit 302, cause the processor or processing circuit 302 to calculate or determine the neurons of the artificial neural network that are significant for the performance of the first task A (i.e., the task-significant neurons in the artificial neural network). In one or more embodiments, the instructions include an EBP or a c-EBP algorithm.

In one or more embodiments, the memory device 301 or the online data storage unit is programmed with instructions which, when executed by the processor or processing circuit 302, cause the processor or processing circuit 302 to determining the importance of the synapses between the neurons for the performance of the first task A for which the artificial neural network was trained (i.e., identify attention-based synaptic importance for the performance of the first task A). In one or more embodiments, the instructions for determining the importance of the synapses may be a Hebbian learning algorithm (e.g., Equation 3 above) or Oja's learning algorithm (e.g., Equation 4 above). Additionally, in one or more embodiments, the memory device 301 or the online data storage unit is programmed with instructions which, when executed by the processor or processing circuit 302, cause the processor or processing circuit 302 to rigidify the important synapses of the artificial neural network. Rigidifying the important synapses may include causing the weights associated with those important synapses to remain fixed or substantially fixed (i.e., remain constant or substantially constant) when the artificial neural network is trained on one or more new tasks. Alternatively, rigidifying the important synapses may include causing those weights associated with the important synapses not to remain fixed, but to be allocated relatively less plasticity than the synapses that are not important for the performance of the first task A. As described above, rigidifying the synapses associated with the important neurons is configured to cause the artificial neural network to exhibit selective plasticity without catastrophic forgetting. In one or more embodiments, the instructions for rigidifying the important synapses may include an algorithm for regularizing the loss function of the artificial neural network (e.g., Equation 5 above).

Additionally, in one or more embodiments, the memory device 301 or the online data storage unit is programmed with instructions which, when executed by the processor or processing circuit 302, cause the processor or processing circuit 302 to train the artificial neural network on a second task B different than the first task A (e.g., semantic segmentation of an image captured by one of the sensors 304, such as a nighttime image captured by a camera). Due to the rigidification of the important synapses of the artificial neural network, the artificial neural network is configured to learn the second task B without catastrophic forgetting of the first task A, as shown, for instance, in FIGS. 4-7.

In one or more embodiments, the memory device 301 or the online data storage unit is programmed with instructions which, when executed by the processor or processing circuit 302, cause the processor or processing circuit 302 to operate the controller 303 to control the device 400 in which the autonomous system 300 is incorporated in accordance with the tasks that the artificial neural network is trained to perform. For instance, in one or more embodiments in which the autonomous system 300 is incorporated into an autonomous vehicle (i.e., the device 400 is an autonomous vehicle), the instructions may cause the processor or processing circuit 302 to actuate the controller 303 to control the steering, braking, and or acceleration of the vehicle (e.g., to avoid one or more hazardous objects or conditions classified during semantic segmentation of a daytime driving scene, a nighttime driving scene, or a rainy driving scene captured by the one or more sensors 304).

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims, and equivalents thereof. Additionally, as used herein, the term "substantially," "about," "approximately", "generally" and similar terms are used as terms of approximation and not as terms of degree, and are intended to account for the inherent deviations in measured or calculated values that would be recognized by those of ordinary skill in the art. Moreover, the tasks described above may be performed in the order described or in any other suitable sequence. Additionally, the methods described above are not limited to the tasks described. Instead, for each embodiment, one or more of the tasks described above may be absent and/or additional tasks may be performed.

What is claimed is:

1. An autonomous system for a vehicle, the autonomous system comprising:
  a controller configured to control the vehicle;
  a plurality of sensors configured to detect objects in a path of the vehicle;
  nonvolatile memory having an artificial neural network stored therein configured to classify the objects detected by the plurality of sensors, the artificial neural network comprising a plurality of neurons in each of an input layer, at least one hidden layer, and an output layer; and
  a processor,
  wherein the nonvolatile memory includes instructions which, when executed by the processor, cause the processor to:
    train the artificial neural network on a first task;
    identify, utilizing a contrastive excitation backpropagation algorithm, important neurons of the plurality of neurons for the first task;
    identify, utilizing a learning algorithm, important synapses between the plurality of neurons for the first task based on the important neurons identified; and
    rigidify the identified important synapses to achieve selective plasticity of the plurality of neurons in the artificial neural network when being trained on one or more new tasks.

2. The autonomous system of claim 1, wherein the instructions, when executed by the processor, further cause the processor to train the artificial neural network on a second task different than the first task.

3. The autonomous system of claim 2, wherein the instructions, when executed by the processor, further cause the processor to:
  send at least one input of the second task to the input layer;
  generate, at the output layer of the plurality of layers, at least one output based on the at least one input;
  generate a reward based on a comparison between the at least one output and a desired output; and
  modify weights of the synapses based on the reward.

4. The autonomous system of claim 3, wherein, during training of the artificial neural network on the second task, the weights of the important synapses remain constant.

5. An autonomous system for a vehicle, the autonomous system comprising:
  a controller configured to control the vehicle;
  a plurality of sensors configured to detect objects in a path of the vehicle;
  nonvolatile memory having an artificial neural network stored therein configured to classify the objects detected by the plurality of sensors, the artificial neural network comprising a plurality of neurons in each of an input layer, at least one hidden layer, and an output layer; and
  a processor,
  wherein the nonvolatile memory includes instructions which, when executed by the processor, cause the processor to:
    train the artificial neural network on a first task;
    identify, utilizing a contrastive excitation backpropagation algorithm, important neurons of the plurality of neurons for the first task;
    identify, utilizing a learning algorithm, important synapses between the plurality of neurons for the first task based on the important neurons identified;
    rigidify the identified important synapses to achieve selective plasticity of the plurality of neurons in the artificial neural network when being trained on one or more new tasks;
    train the artificial neural network on a second task different than the first task;
    send at least one input of the second task to the input layer of the plurality of layers;
    generate, at the output layer of the plurality of layers, at least one output based on the at least one input;
    generate a reward based on a comparison between the at least one output and a desired output; and
    modify weights of the synapses based on the reward,
  wherein, during training of the artificial neural network on the second task, the weights of the important synapses remain constant, and
  wherein the learning algorithm to identify important synapses is a Hebbian learning algorithm as follows:

$$\beta_{ji}^{l} = \beta_{ji}^{l} + P(a_j^l(x_n))P(a_i^{l+1}(x_n)),$$

where $\beta_{ji}^{l}$ is a synaptic importance parameter, $x_n$ is an input image, $a_j^l$ is a j'th neuron in an l'th layer of the artificial neural network, $a_i^{l+1}$ is an i'th neuron in layer l+1 of the artificial neural network, and P is a probability.

6. An autonomous system for a vehicle, the autonomous system comprising:
  a controller configured to control the vehicle;
  a plurality of sensors configured to detect objects in a path of the vehicle;
  nonvolatile memory having an artificial neural network stored therein configured to classify the objects detected by the plurality of sensors, the artificial neural network comprising a plurality of neurons in each of an input layer, at least one hidden layer, and an output layer; and
  a processor,
  wherein the nonvolatile memory includes instructions which, when executed by the processor, cause the processor to:
    train the artificial neural network on a first task;
    identify, utilizing a contrastive excitation backpropadation algorithm, important neurons of the plurality of neurons for the first task;
    identify, utilizing a learning algorithm, important synapses between the plurality of neurons for the first task based on the important neurons identified;
    rigidify the identified important synapses to achieve selective plasticity of the plurality of neurons in the artificial neural network when being trained on one or more new tasks;
    train the artificial neural network on a second task different than the first task;
    send at least one input of the second task to the input layer of the plurality of layers;

generate, at the output layer of the plurality of layers, at least one output based on the at least one input;

generate a reward based on a comparison between the at least one output and a desired output; and modify weights of the synapses based on the reward, wherein, during training of the artificial neural network on the second task, the weights of the important synapses remain constant, and wherein the learning algorithm to identify important synapses is Oja's learning rule as follows:

$$\gamma_{ji}^l = \gamma_{ji}^l + \in (P_c(f_j^{(l-1)})P_c(f_j^l) - P_c(f_i^l)^2 \gamma_{ji}^l),$$

where i and j are neurons, l is a layer of the artificial neural network, $P_c$ is a probability, $\gamma_{ji}^l$ is the importance of the synapse between the neurons $f_j^{(l-1)}$ and $f_i^l$ for the first task, $\in$ is the rate of Oja's learning rule, and $P_c$ is a probability.

7. The autonomous system of claim 6, wherein the instructions which, when executed by the processor, further cause the processor to update a loss function of the artificial neural network as follows:

$$\mathcal{L}(\theta) = \mathcal{L}_B(\theta) + \lambda \Sigma_k \gamma_k (\theta_k - \theta^*_{A,k})^2,$$

where $\mathcal{L}(\theta)$ is the loss function, $\mathcal{L}_B(\theta)$ is an original loss function for learning a second task different than the first task, $\lambda$ is the regularization coefficient, $\gamma_k$ is the synaptic importance parameter of Oja's learning rule, $\theta_k$ is the synaptic weights, and $\theta^*_{A,k}$ are the optimized synaptic weights for performing the first task.

8. A non-transitory computer-readable storage medium having software instructions stored therein, which, when executed by a processor, cause the processor to:

train an artificial neural network on a first task;

identify, utilizing a contrastive excitation backpropagation algorithm, important neurons of the artificial neural network for the first task;

identify, utilizing a learning algorithm, important synapses between the important neurons; and rigidify the identified important synapses to achieve selective plasticity of the artificial neural network when being trained on one or more new tasks.

9. The non-transitory computer-readable storage medium of claim 8, wherein the instructions, when executed by the processor, further cause the processor to train the artificial neural network on a second task different than the first task.

10. The non-transitory computer-readable storage medium of claim 9, wherein the instructions, when executed by the processor, further cause the processor to:

send at least one input of the second task to an input layer of the artificial neural network;

receive at least one output from an output layer of the artificial neural network based on the at least one input;

generate a reward based on a comparison between at least one output and a desired output; and modify weights of the synapses based on the reward.

11. The non-transitory computer-readable storage medium of claim 10, wherein, during training of the artificial neural network on the second task, the weights of the important synapses remain constant.

12. The non-transitory computer-readable storage medium of claim 11, wherein the learning algorithm is a Hebbian learning algorithm as follows:

$$\beta_{ji}^l = \beta_{ji}^l + P(a_j^l(x_n))P(a_i^{l+1}(x_n)),$$

where $\beta_{ji}^l$ is a synaptic importance parameter, $x_n$ is an input image, $a_j^l$ is a j'th neuron in an l'th layer of the artificial neural network, $a_i^{l+1}$ is an i'th neuron in layer l+1 of the artificial neural network, and P is a probability.

13. The non-transitory computer-readable storage medium of claim 11, wherein the learning algorithm is Oja's learning rule as follows:

$$\gamma_{ji}^l = \gamma_{ji}^l + \in (P_c(f_j^{(l-1)})P_c(f_j^l) - P_c(f_i^l)^2 \gamma_{ji}^l),$$

where i and j are neurons, l is a layer of the artificial neural network, $P_c$ is a probability, $\gamma_{ji}^l$ is the importance of the synapse between the neurons $f_j^{(l-1)}$ and $f_i^l$ for the first task, $\in$ is the rate of Oja's learning rule, and $P_c$ is a probability.

14. The non-transitory computer-readable storage medium of claim 13, wherein the instructions which, when executed by the processor, further cause the processor to update a loss function of the artificial neural network as follows:

$$\mathcal{L}(\theta) = \mathcal{L}_B(\theta) + \lambda \sum_k \gamma_k (\theta_k - \theta^*_{A,k})^2$$

where $\mathcal{L}(\theta)$ is the loss function, $\mathcal{L}_B(\theta)$ is an original loss function for learning a second task different than the first task, $\lambda$ is the regularization coefficient, $\gamma_k$ is the synaptic importance parameter of Oja's learning rule, $\theta_k$ is the synaptic weights, and $\theta^*_{A,k}$ are the optimized synaptic weights for performing the first task.

15. A method of training an artificial neural network having a plurality of layers, each layer of the plurality of layers comprising a plurality of neurons, and at least one weight matrix encoding connection weights between neurons in successive layers of the plurality of layers, the method comprising:

training the artificial neural network on a first task;

identifying, utilizing contrastive excitation backpropagation, important neurons for the first task;

identifying, utilizing a learning algorithm, important synapses for the first task based on the important neurons identified; and rigidifying the identified important synapses to achieve selective plasticity of the plurality of neurons in the artificial neural network when being trained on one or more new tasks.

16. The method of claim 15, further comprising training the artificial neural network on a second task different than the first task, the training of the artificial neural network on the second task comprising:

sending at least one input of the second task to an input layer of the plurality of layers;

generating, at an output layer of the plurality of layers, at least one output based on the at least one input;

generating a reward based on a comparison between the at least one output and a desired output; and modifying the connection weights based on the reward.

17. The method of claim 16, wherein, during the training of the artificial neural network on the second task, the weights of the important synapses remain constant.

18. The method of claim 17, wherein the learning algorithm is a Hebbian learning algorithm as follows:

$$\beta_{ji}^l = \beta_{ji}^l + P(a_j^l(x_n))P(a_i^{l+1}(x_n)),$$

where $\beta_{ji}^l$ is a synaptic importance parameter, $x_n$ is an input image, $a_j^l$ is a j'th neuron in an l'th layer of the artificial neural network, $a_i^{l+1}$ is an i'th neuron in layer l+1 of the artificial neural network, and P is a probability.

19. The method of claim 17, wherein the learning algorithm is Oja's learning rule as follows:

$$\gamma_{ji}^l = \gamma_{ji}^l + \in (P_c(f_j^{(l-1)})P_c(f_j^l) - P_c(f_i^l)^2 \gamma_{ji}^l),$$

where i and j are neurons, l is a layer of the artificial neural network, $P_c$ is a probability, $\gamma_{ji}^l$ is the importance of the synapse between the neurons $f_j^{(l-1)}$ and $f_i^l$ for the first task, $\in$ is the rate of Oja's learning rule, and $P_c$ is a probability.

20. The method of claim 19, further comprising updating a loss function of the artificial neural network as follows:

$$\mathcal{L}(\theta) = \mathcal{L}_B(\theta) + \lambda \Sigma_k \gamma_k (\theta_k - \theta^*_{A,k})^2$$

where $\mathcal{L}(\theta)$ is the loss function, $\mathcal{L}_B(\theta)$ is an original loss function for learning a second task different than the first task, $\lambda$ is the regularization coefficient, $\gamma_k$ is the synaptic importance parameter of Oja's learning rule, $\theta_k$ is the synaptic weights, and $\theta^*_{A,k}$ are the optimized synaptic weights for performing the first task.

\* \* \* \* \*

UNITED STATES PATENT AND TRADEMARK OFFICE
CERTIFICATE OF CORRECTION

| | | |
|---|---|---|
| PATENT NO. | : 11,210,559 B1 | Page 1 of 1 |
| APPLICATION NO. | : 16/549784 | |
| DATED | : December 28, 2021 | |
| INVENTOR(S) | : Soheil Kolouri et al. | |

It is certified that error appears in the above-identified patent and that said Letters Patent is hereby corrected as shown below:

In the Specification

In Column 1, Line 14, please insert:
-- GOVERNMENT LICENSE RIGHTS
This invention was made with government support under Contract No. FA8750-18-C-0103 awarded by DARPA. The government has certain rights in the invention. --

Signed and Sealed this
Eleventh Day of June, 2024

Katherine Kelly Vidal
*Director of the United States Patent and Trademark Office*